United States Patent [19]
Ng et al.

[11] Patent Number: 6,005,981
[45] Date of Patent: *Dec. 21, 1999

[54] QUADTREE-STRUCTURED CODING OF COLOR IMAGES AND INTRA-CODED IMAGES

[75] Inventors: Hak-Leong Ng, Los Altos; Xiaonong Ran, Cupertino, both of Calif.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/631,652

[22] Filed: Apr. 11, 1996

[51] Int. Cl.⁶ .............................. G06K 9/36; G06K 9/46
[52] U.S. Cl. .................. 382/240; 382/166; 382/248; 382/253; 382/281
[58] Field of Search .................. 382/166, 232, 382/240, 248, 281, 236, 244, 226; 358/430, 433, 432, 539; 348/398, 568, 408, 437, 438, 395, 393, 391, 396; 345/202; 341/79

[56] References Cited

U.S. PATENT DOCUMENTS

| | | | |
|---|---|---|---|
| 4,811,112 | 3/1989 | Rutledge | 358/430 |
| 4,944,023 | 7/1990 | Imao et al. | 382/240 |
| 5,021,971 | 6/1991 | Lindsay | 364/513.5 |
| 5,446,806 | 8/1995 | Ran et al. | 382/240 |
| 5,509,089 | 4/1996 | Ghoshal | 382/236 |

OTHER PUBLICATIONS

Po et al., Quadtree based colour quantisation image compression, Nov. 9, 1995, 1988–1990, Electronics Letters.

Jin et al., Color Image Sequence Coding With Variable Block Size Motion, 1993, 974–977, IEEE Tencon '93.

*Primary Examiner*—Amelia Au
*Assistant Examiner*—Timothy M. Johnson
*Attorney, Agent, or Firm*—Skjerven, Morrill, MacPherson Franklin & Friel LLP; David T. Millers

[57] ABSTRACT

An encoding process is configurable to trade calculational complexity for bit rate while maintaining code format and image quality. A software encoder which implements the encoding process monitors bandwidth and processor utilization and when either is overtaxed, adjusts complexity to compensate. If further adjustment is required, encoded image quality is changed. Changing the search process or search window size used during searches for predictive blocks or changing a threshold which is compared to inter-code length before determining whether to calculate an intra-code changes complexity. An intra-coding method subtracts a base which depends on codes representing neighboring blocks from coefficients for a current block to determine a difference which is often small and easily compressed. Additionally, restricting a quadtree structure for one color component to a sub-tree of a quadtree structure for another other color component improves compression efficiency and reduces coding complexity.

13 Claims, 8 Drawing Sheets

FIG. 9

QUADTREE-STRUCTURED CODING OF COLOR IMAGES AND INTRA-CODED IMAGES

BACKGROUND OF THE INVENTION

1. Field of the Invention

This invention relates to systems and methods for encoding, compressing, and transmitting or storing video or still images.

2. Description of Related Art

Many types of video encoders compress video images to reduce the amount of data which is transmitted over digital channels or stored on media or in memory. Typically, a video encoder receives a digitized video image as pixel maps representing a series of frames which are displayed in sequence to form a moving image. The video encoder converts the pixel maps into coded video data which requires fewer bits to express. An ideal coding method for a video encoder has low computational complexity to allow fast coding with minimal processing circuitry, high compression to reduce bandwidth required to transmit or store the video data, and retains a high quality image after encoding. Such ideal coding methods are difficult to achieve. Usually, complexity must be increased and/or the image quality decreased to improve compression. Coding methods which improve compression without a corresponding increase in complexity or which reduce complexity without a corresponding loss of compression or image quality are sought.

Lacking an ideal coding method, coding methods suited for particular applications are typically selected according to the compression required for the available bandwidth and the available processing power. An application which transmits video over a channel having a very limited bandwidth often uses complex coding to greatly reduce the amount of data needed to accurately convey a video image. This requires computational resources of sufficient power to perform complex coding at the frame rate of the video image. Complex coding may be unsuited for applications having limited or shared computational resources and a relatively large bandwidth transmission channel.

Selecting a suitable video coding method for a software encoder which runs on a variety of platforms having different levels of available computing power presents additional problems. If a minimum complexity coding method suitable for a low power platforms is selected, video compression often suffers so that transmission channel bandwidth may be overtaxed (unable to meet the desired frame rate) while computational power of high power platforms is wasted. In contrast, if a high complexity coding method is employed, low power platforms may be unable to encode video at the desired frame rate; and transmission channel bandwidth may be wasted at the expense of computing power which could be used for other purposes.

SUMMARY OF THE INVENTION

In accordance with an aspect of the invention, a video encoder provides high compression of video data from a relatively low complexity coding process. In one embodiment, a video encoder uses quadtree structured coding; and to reduce code lengths when multiple arrays of pixel color components represent a frame in a video image, a quadtree structure for a first array of color components for the frame is restricted to being a sub-tree of the quadtree structure for a second of the two-dimensional arrays. Code lengths are decreased because the sub-tree is only transmitted or stored once but represents information for two or three two-dimensional arrays of color components.

In some embodiments, Walsh transform coefficients represent the content of blocks associated with leaf nodes of a quadtree structure; and during intra-coding of a frame, a video encoder maintains a base vector which is subtracted from Walsh transform coefficients to generate a difference. The difference between the base vector and the Walsh transform coefficients of the block is quantized and incorporated in a bit stream which is run length/or and entropy coded. The video encoder changes the base vector to conform to previous quantized Walsh transforms so that generally the difference between the base and encoded Walsh transforms is small and efficiently compressed.

With one coding process in accordance with an embodiment of the invention, a video encoder codes each block of video data using multiple coding methods. For example, each block is inter-coded and intra-coded to generate and inter-code and intra-code. The video encoder then incorporates the shortest one of the generated codes into a compressed bit stream. Multiple coding of each block improves compression but increases coding complexity. To decrease complexity, a code generated according to a first coding method is compared to a threshold length and a second code is calculated only if the first code is longer than the threshold length. The shorter of the codes calculated is incorporated into the compressed video bit stream.

In one specific embodiment of the invention, during inter-coding of a frame, a video encoder inter-codes each block of the frame and if the generated inter-code is longer than a threshold length, also intra-codes the block. The video encoder then uses the shorter one of the inter-code and the intra-code. This improves compression but only modestly increases complexity because determination of intra-codes can be limited to the few cases where the inter-code is unusually long.

In accordance with another aspect of the invention, a software video encoder has coding complexity which adjusts according to the available resources of the platform implementing the encoder. (Complexity as used herein refers to the number or duration of calculations required to generate codes representing a frame of video data.) Complexity is decreased if a data channel has an excess of bandwidth for video data and a processor in the platform is overtaxed. Complexity is increased for better compression when processor load is low and bandwidth is overtaxed. One way of adjusting complexity is changing the threshold length used when selecting whether to try intra-coding of a block that was inter-coded. The software encoder may have complexity preset according to the application or can adjust its own complexity at run time to account for shared use of the processor and data channel.

BRIEF DESCRIPTION OF THE DRAWINGS

Use of the same reference symbols in different figures indicates similar or identical items.

DETAILED DESCRIPTION OF THE PREFERRED EMBODIMENTS

A video image conventionally consists of a sequence of frames which represent instants in the video image and are displayed sequentially to provide the illusion of motion. Each frame of a video image can be digitally represented by pixel maps which include one or more two-dimensional arrays of pixel values, where each pixel value identifies a characteristic of an area (picture element or pixel) in the video image at the instant corresponding to the frame. For example, in a representation of a video frame commonly referred to as the YUV color representation, each frame has three corresponding two-dimensional arrays of pixel values, an array the Y components (i.e. luminances) of pixels in the frame, and two arrays representing U and V components (i.e. chrominances) of pixels in the frame.

Coding converts the arrays of pixel values into codes which require fewer bits to express than do the original arrays. The video image can then be stored or transmitted using less memory or bandwidth. In one type of coding process such as defined by the H.263 protocol for videophones, each frame of a video image is either an intra-frame which is intra-coded or an inter-frame which is inter-coded. Intra-coding encodes a frame using solely the pixel values for the frame and is applicable to still images and individual frames or blocks within a moving image. Inter-coding combines pixel values of a current frame with information from previous frames and is generally applicable to moving image coding.

During coding, a frame is typically partitioned into root blocks which are typically 16-by-16 or 32-by-32 pixels to avoid the computational complexity which may arise from manipulating larger arrays of pixel values. The root blocks are then encoded. U.S. Pat. No. 5,446,806, entitled "Quadtree-Structured Walsh Transform Video/Image Coding" describes a quadtree structured coding process which uses a fixed number of Walsh transform coefficients to represent the content of blocks (or sub-blocks) and is incorporated by reference herein in its entry. According to a quadtree-structure coding process, sub-blocks from a predetermined initial partition of a root block are merged to form a larger sub-block when the content of the larger sub-block can be adequately described by a few code values.

Figure 1A:
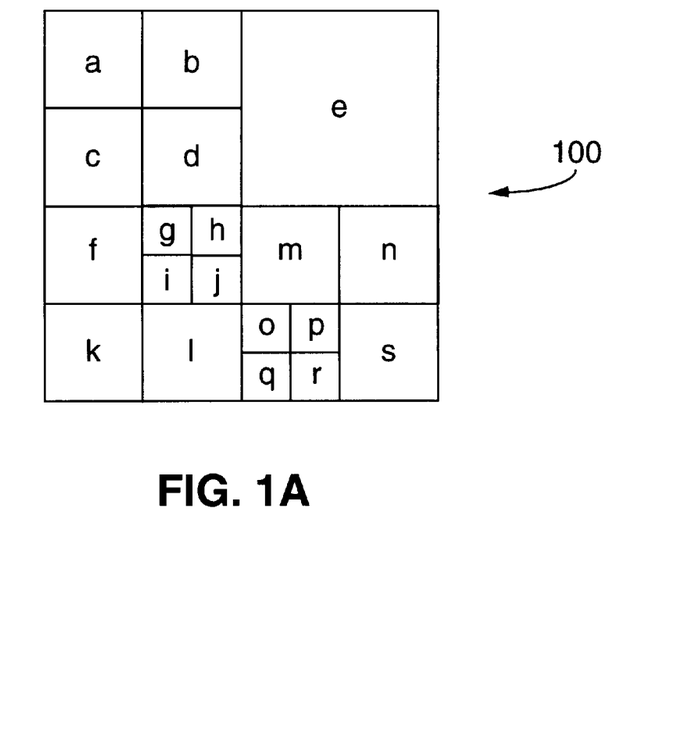
FIGS. 1A and 1B respectively illustrate a quadtree partition of a block and the associated quadtree structure.
Figure 1B:
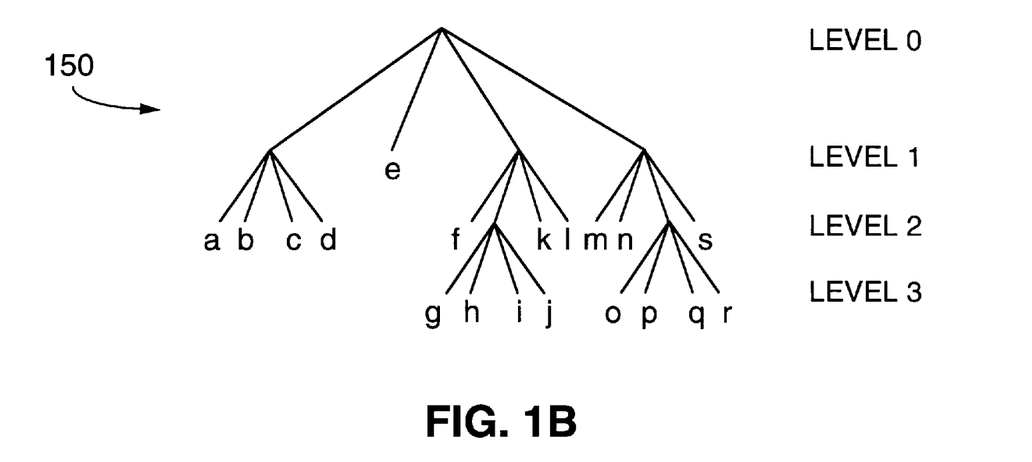

FIGS. 1A and 1B respectively show an exemplary quadtree partition 100 of a block of pixel values and the resulting quadtree structure 150 for the block. Quadtree partition 100 contains sub-blocks a to s of pixel values which are selected from the original block by a merging procedure. U.S. Pat. No. 5,446,806 describes a merging procedure where a fixed number of Walsh transform coefficients describe the content of each sub-block a to s and blocks were merged to form sub-blocks a to s if using the fixed number of Walsh transform coefficients for the merged block increased the error per pixel by less than a threshold amount. Quadtree structure 150 consists of branches connecting nodes at four levels 0 to 3, where each level n corresponds to a preselected partition of block 100 into $4^n$ sub-blocks. Level 0 correspond to a partition having a single sub-block, i.e. the original block, and partitioning each block in a preselected partition corresponding to level (n−1) into four smaller blocks forms the preselected partition corresponding to each level n. The highest level partition may contain one pixel value per block or as many pixel values as there are coefficients to describe a block corresponding to a leaf node of quadtree structure 150.

Each node in quadtree structure 150 identifies a block in a preselected partition corresponding to the level of the node. Nodes having branches to a next higher level identify blocks that are not in quadtree partition 100. Leaf nodes of quadtree structure 150 (i.e., nodes without branches extending to higher levels) indicate blocks a to s which are in quadtree partition 100. A quadtree code generated for the root block indicates quadtree structure 150 and includes values which describe the content of the blocks associated with leaf nodes of quadtree structure 150 (i.e. the content of blocks a to s).

For YUV color video, three color components Y (luminance), U and V (chrominances) of a root block are normally represented by three arrays of pixel values. Arrays for representing components U and V often contain fewer pixel values than the array which represent the Y component of the root block. For example, in a well known YUV 4:1:1 format, an area in a frame represented by four Y values (normally four pixels) has only one U value and one V value. Thus, a 16-by-16 pixel root block is represented by a 16-by-16 array of Y values, an 8-by-8 array of U values, and an 8-by-8 array of V values. The arrays of Y values, U values, and V values have associated quadtrees structures referred to herein as the Y-tree, the U-tree, and the V-tree.

Figure 2:
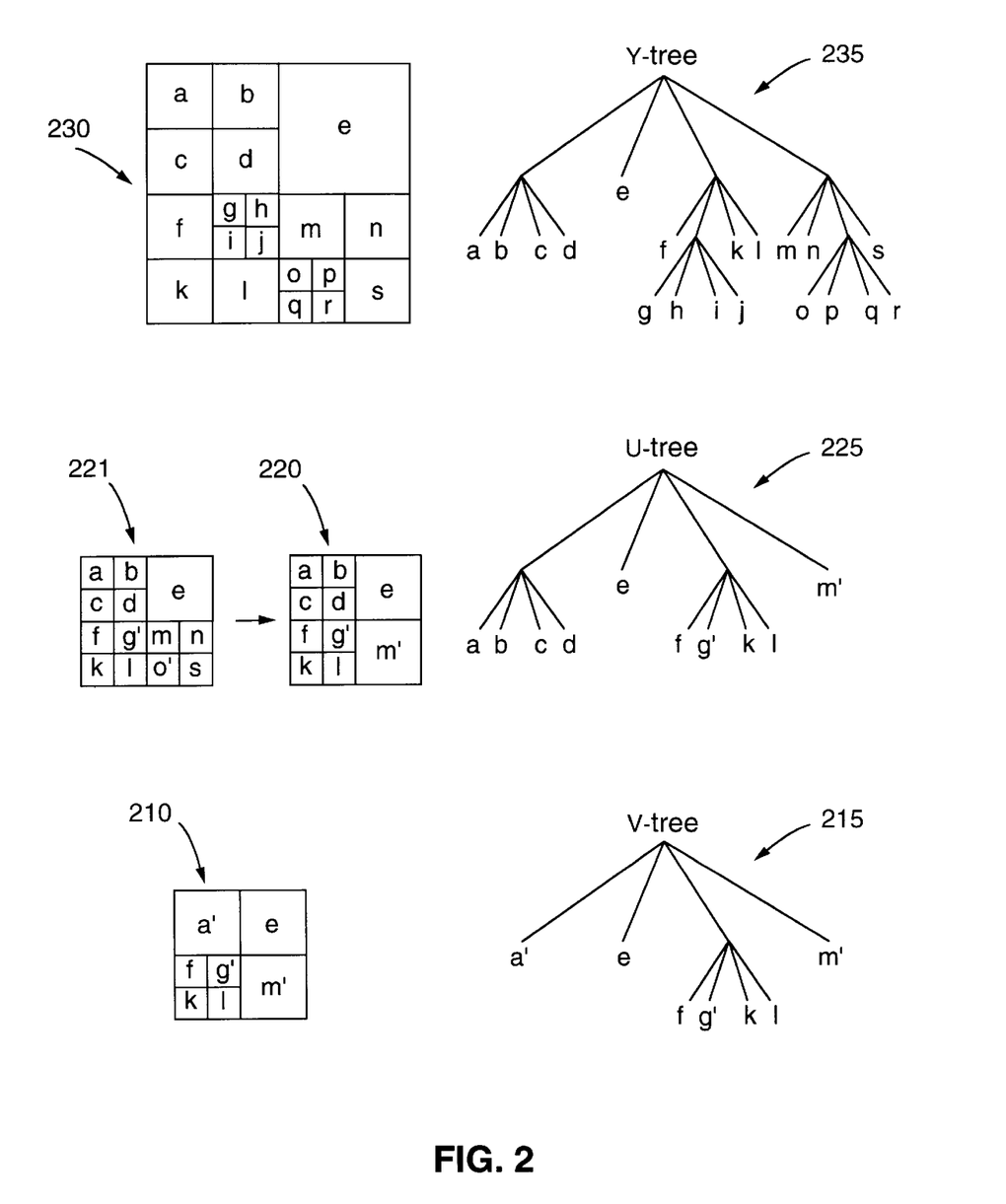
FIG. 2 illustrates relations among quadtree partitions and quadtree structures of three color components in a coding process in accordance with an embodiment of the invention.

In accordance with an aspect of the invention, the V-tree for a frame is required to be a sub-tree of the U-tree for the frame which is in turn required to be a sub-tree of the Y-tree for the frame. FIG. 2 illustrates an example relationship between a Y-tree 235, a U-tree 225, and a V-tree 215 for a frame and corresponding quadtree partitions 230, 220, and 210 of a 16-by-16 array of Y values, an 8-by-8 array of U values, and an 8-by-8 array of V values, respectively.

The requirements on Y-tree 235, U-tree 225, and V-tree 225 simplify coding of a root block because pruning Y-tree 235 generates U-tree 225, and pruning U-tree 225 generates V-tree 215. In particular, a coding method starts with a highest level (e.g. level 3) preselected partition of the array of Y values and determines which sets of four blocks in the highest level partition should be merged. The merging forms an intermediate partition containing blocks from the highest level (e.g. level 3) preselected partition and blocks from a next lower level (e.g. level 2) preselected partition. Merging continues testing and merging blocks at progressively lower levels until no further merging is required and quadtree partition 230 is reached. Quadtree partition 230 defines the structure of Y-tree 235.

Y-tree 235 in turn defines a beginning partition 221 from which partition 220 and U-tree 225 are determined. Partition 221 contains blocks of U values associated with Y-tree 235. For example, if block U has predefined partitions corresponding each level of Y-tree 235 the leaf nodes of Y-tree 235 identify blocks in partition 221. If the array of U values has fewer levels of predetermined partitions because the U array is smaller, the highest level branches of Y-tree 235 are pruned when forming U-tree 221. For example, if array 230 is a 16-by-16 array of Y-values, each block g, h, i, j, o, p, q, and r in the level three partition of the Y array contains one pixel. Array 220 which is an 8-by-8 pixel value array does not have a level three partition since the level two predetermined partition has only one U-value per block. Pruning the third level from Y-tree 235 provides a three level quadtree structure which corresponds to beginning partition 221. Block merging test sets of four blocks from the same level to determine whether any set of four blocks in partition 221 should be merged. In FIG. 2, blocks m, n, o', and s merge to form bock m'.

V-tree 215 is determined from a beginning partition defined by U-tree 225. Merging of blocks in the beginning partition creates the partition 210 which is associated with quadtree structure 215. In FIG. 2, blocks of v values associated with blocks a, b, c, and d are merged to form block a'. In an alternative embodiment of the invention, V-tree 215 is required to be a sub-tree of Y-tree 235 and U-tree 225 is required to be a sub-tree of V-tree 215. In still another alternative embodiment, V-tree 215 and U-tree 225 are required to be sub-trees of Y-tree 235 but not sub-trees of each other.

For natural videos, the sub-tree restrictions cause little distortion in the decoded video because the three color components are related. If a block of Y values are similar chances are good that U values and V values in the block are sufficiently similar that combining the values into a single block does not cause large distortion in the encoded image. Coding complexity is reduced because determinations of U-trees and V-trees start from a developed quadtree having fewer possible mergings to evaluate. Compression tends to be improved because a code representing the V-tree provides trunks of U-tree, and only the additional branches in the U-tree are encoded to represent the U-tree. Similarly, the U-tree provides trunks of the Y-tree, and only the additional branches in Y-tree are encoded. In the alternative, the relationships between a first encoded quadtree structure and a second encoded quadtree structure is indicated by branches remove from and/or branches added to the first quadtree structure to form the second quadtree structure.

An advantage of the sub-tree restrictions is decreased decoding computational complexity. Since a block merged for Y values always has one set of U and V values, if a color conversion to RGB domain is needed, the whole area of the block can be filled with a single RGB vector; no further condition checking or partitioning is required. However, the restrictions on quadtree structures for color components is not restricted to YUV color but also applies to other color formats including RGB color.

The restrictions on quadtree structures which describe Y, U, and V arrays for a frame of a video image apply to intra-coding and inter-coding. In accordance with another aspect of the invention, intra-block differential pulse code modulation (DPCM) coding improves compression of intra-coded blocks with or without the restrictions on quadtrees for color component arrays. For intra-block DPCM coding, a difference between a base vector and code vector which describes the content of a block or sub-block within a frame is determined before the code vector is quantized and entropy or run length encoded. If the base vector is properly selected, the difference is small and compression is improved.

An example application of intra-block DPCM coding is described for quadtree structured Walsh transform coding applied to the block illustrated in FIG. 1 although intra-block DPCM also applies to intra-coding with or without blocks partitioned according to a quadtree structure or code vectors which are Walsh transform coefficients. Quadtree structured Walsh transform coding stores a fixed number of Walsh transform coefficients per leaf node in a quadtree structure regardless of the size of the sub-block represented by the leaf node. For example, if sub-blocks a and g are respectively represented by 4-by-4 and 2-by-2 arrays of pixel values, the Walsh transforms of blocks a and g are respectively 4-by-4 and 2-by-2 arrays of Walsh transform coefficients. A single coefficient, w00, or four coefficients, w00, w01, w10, and w11, from the Walsh transforms may be encoded per leaf node. The coded coefficients are denoted herein by a code vector W, and for the example coding method, code vector W is equal to {w00} or {w00, w01, w10, w11}. The code vector W for a node a is denoted as Wa, similarly for other nodes. An exemplary quadtree code provides the code vectors in a one-dimensional order Wa, Wb, Wc, Wd, . . . , Wr, Ws which follows a zig-zag pattern through the sub-blocks in quadtree partition 100 so that code vectors consecutive in the quadtree code are typically near each other in the root block.

An exemplary embodiment of DPCM intra-coding uses a base vector W* which starts with the same known value for every root block but changes in value during coding of each root block. An exemplary DPCM intra-coding method, referred to herein as one-dimensional DPCM, includes four steps for each sub-block x of a block being intra code, (1) compute Wx−W*, (2) quantize Wx−W* with a uniform step-size quantizer, (3) set W* equal to W* plus the quantized value Wx−W*, and (4) encode the quantized value Wx−W* with an entropy encoder. After each block is encoded, base vector W* is equal the decoded value for the just encoded vector Wx. If the next code vector W(x+1) represents an area near the area represented by Wx, the code vectors Wx and W(x+1) will often be similar and the difference W(x+1)−Wx small. Thus, entropy coding efficiently compresses the quantized differences.

Figure 3:
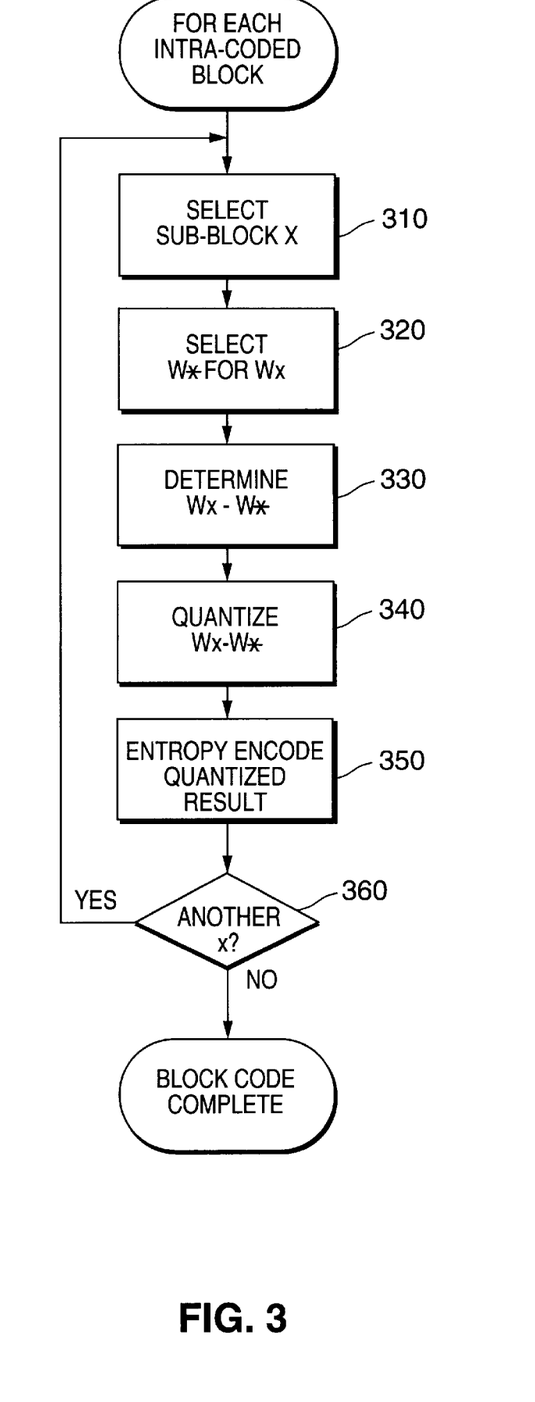
FIG. 3 is a flow diagram of an intra-coding process in accordance with an embodiment of the invention.

FIG. 3 illustrates a more general DPCM intra-coding method which begins by selecting 310 a sub-block x of a block being intra-coded. The order in which sub-blocks are selected and encoded determines the information available to a decoder for selecting 320 base vector W* for subsequent encoded sub-blocks. In one embodiment of the invention, the selected base vector W* has a fixed value known to both the encoder and decoder for the first sub-block of each root block. Alternatively, the base vector W* could be reset to the fixed value less frequently, for example at the beginning of each frame. Some advantages of starting with a fixed base vector W* are that no bits are required to transmit an initial base vector and starting each root block at the fixed base vector resets and stabilizes the coding by reducing propagation of errors.

After the initial fixed value for base vector W*, base vector W* changes according to the previously encoded vectors. For example, if code vectors Wa to Ws are transmitted in the order, the base vector W* selected for sub-block b can depend on code vector Wa. The base vector W* selected for sub-block c can depend on the coded vectors Wa and Wb, and the base vector for a selected sub-block can generally depend on the code vectors provided before the code vector for the selected sub-block. One-dimensional DPCM intra-coding uses decoded vector W(x−1) for the base vector W* when coding vector Wx. If the order a to s follows a zig-zag path through quadtree partition 100, the base vector W* will often but not always be a code vector of a sub-block near the sub-block being encoded.

A method referred to herein as two-dimensional DPCM intra-coding selects W* as a function of previously coded vectors which border on the sub-block selected in step 310. For example, W* is selected to be equal to Wa for sub-blocks b and c, and W* is selected to be Wb, Wc or a weighted average of Wa, Wb, and Wc when encoding sub-block d. In two-dimensional DPCM intra-coding, the base vector is selected for geometric proximity to the sub-block being coded rather than proximity in the sequence of the code. The encoder and decoder can use any desired predefined rule for selecting base vector W* in step 320.

Once base vector W* is selected, the difference Wx–W* is determined in step 330, quantized in step 340, and entropy encoded in step 350. Quantization 340 is performed using a uniform step-size which divides the difference Wx–W* by a fixed step-size and truncates the result to a fixed number of bits. Uniform step size quantization provides a simple quantization method which when combined with entropy encoding efficiently compresses video data. Entropy coding can be for example, Huffman coding or arithmetic coding. After entropy coding 350, DPCM intra-coding of the root bock continues by selecting 310 another sub-block or after last sub-block stops.

Intra-coded frames are frames in which all root blocks are intra-coded. Inter-coded frames can have some inter-coded root blocks and some intra-coded root blocks. Inter-coding of a root block commonly begins with motion estimation which searches a preceding decoded frame for a "predictive" block that closely matches the current frame. U.S. patent app. Ser. No. 08/347,771, entitled "Motion Estimation Using a Hierarchial Search" describes motion estimation and methods for determining a predictive block and is incorporated by reference herein in its entirety. Once a predictive block for the root block is found, a quadtree structured coding process or any other coding process can encode the difference between the root block and the predictive block. Ideally, an encoded difference block contains all or mostly zeros or another combination of values which is efficiently compressed. However, in some cases when motion estimation does not find a closely matching predictive block, little or no compression results.

Figure 4:
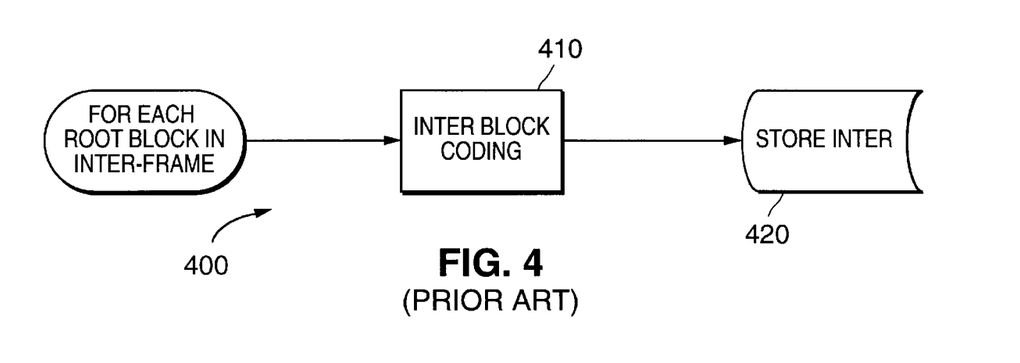
FIG. 4 is a flow diagram of a prior art intercoding process.

FIG. 4 illustrates a relatively simple coding method 400 which performs inter-coding 410 on each root block of an inter-frame and stores 420 the resulting inter-code. Method 400 uses the inter-codes and motion vectors identifying the predictive blocks regardless of the resulting amount of compression. Applications of coding method 400 include a video encoder which receives output from a video camera and stores a compressed video image in a data buffer or other memory or on a storage medium such as a hard disc or optical disc. The compressed video data can also be transmitted over a channel, for example, after storing the compressed data in a video data buffer. In situations, where a video image changes rapidly, coding method 400 may not provide much compression and storage or available bandwidth may be exhausted before a video image is complete.

Figure 5A:
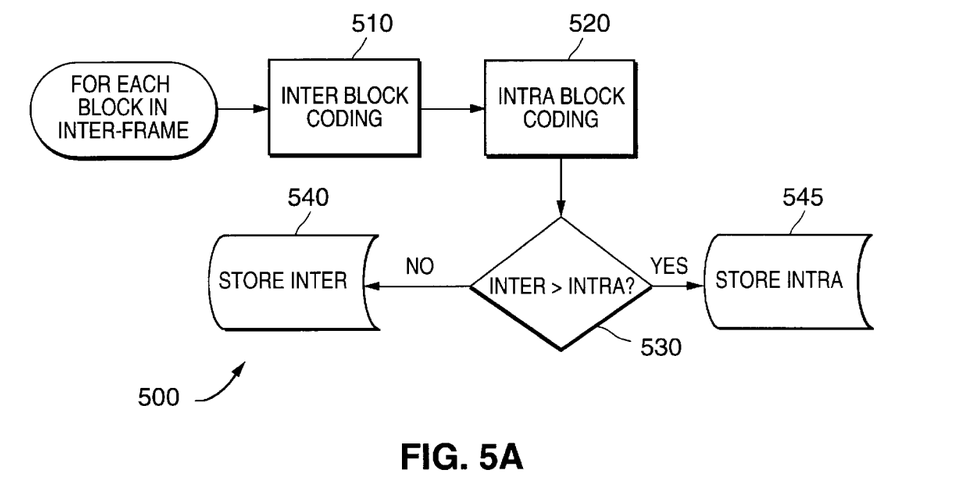
FIGS. 5A and 5B respectively illustrate a video coding process and encoder in accordance with an embodiment of the invention.
Figure 5B:
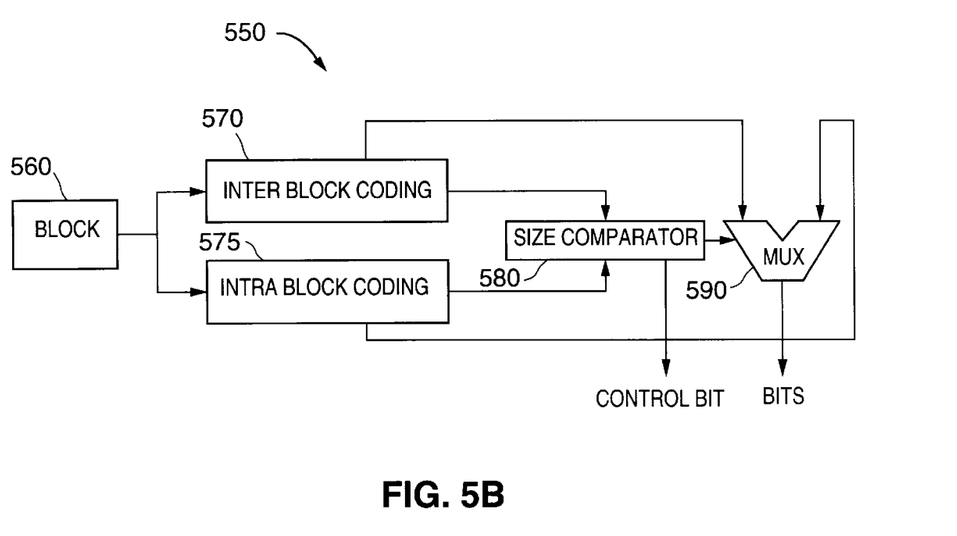

FIGS. 5A and 5B respectively illustrate a video coding method 500 which provides better compression than method 400 and a video encoder 550 which implements coding method 500. Coding method 500 operates on blocks from an inter-frame stored in a memory 560. In initial steps 510 and 520 of coding method 500, inter-coding and intra-coding elements 570 and 574 respectively inter-code (step 510) and intra-code (step 520) a root block. Elements 570 and 575 may be separate circuits which independently implement the respective coding processes or software processes sequentially executed by a processor, and coding steps 510 and 520 are either performed in series or in parallel depending on the abilities of video encoder 550. Since the intra-block coding is the same for inter-frames and intra-frames, coding element 575 can also code blocks of intra-frames. Coding elements 570 and 575 provide about equal quality in a decoded image. For example, equivalent quantization stepsizes (and merging thresholds for quadtree coding) maintain similar distortion level in decoded images.

A size comparator 580 compares (step 530) an inter-code from coding element 570 and an intra-code from coding element 575 to determine which of the two codes is shorter. Size comparator 580 generates a control bit which is applied to a multiplexer 590 to select whether the inter-code from element 570 or the intra-code from element 575 is incorporated in a coded bit stream from video encoder 550. The control bit is also incorporated into the bit stream to indicate to a decoder whether the block is intra-coded or inter-coded. Step 540 or 550 stores the one of the codes containing the fewest bits, and the unused code is discarded. Coding method 500 encodes each root block twice (steps 510 and 520) and thus requires more calculations than method 400 which simply determines an inter-code for each root block. However, coding method 500 improves average compression because smaller intra-codes sometimes replace larger inter-codes.

Figure 6A:
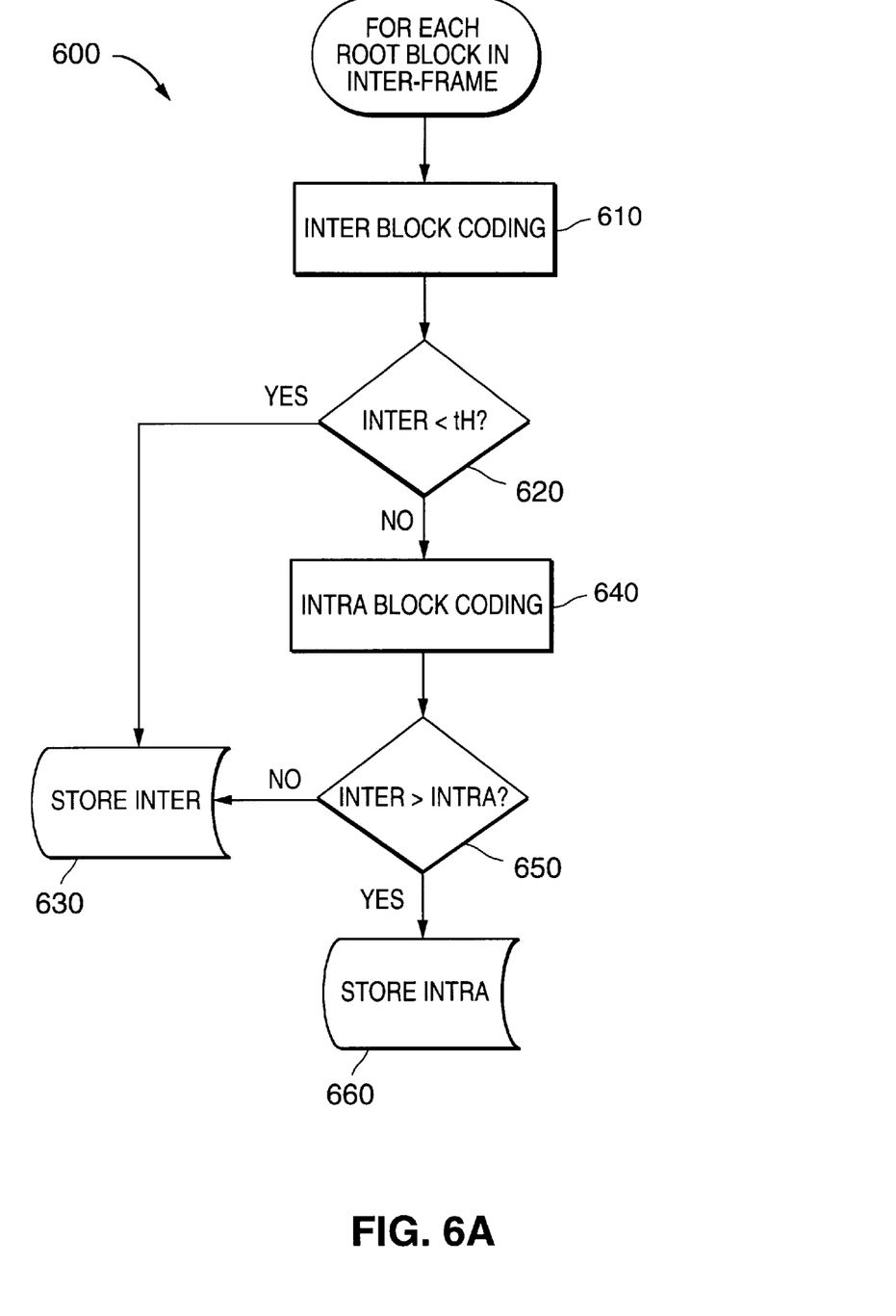
FIGS. 6A and 6B respectively illustrate a video coding process and encoder in accordance with another embodiment of the invention.
Figure 6B:
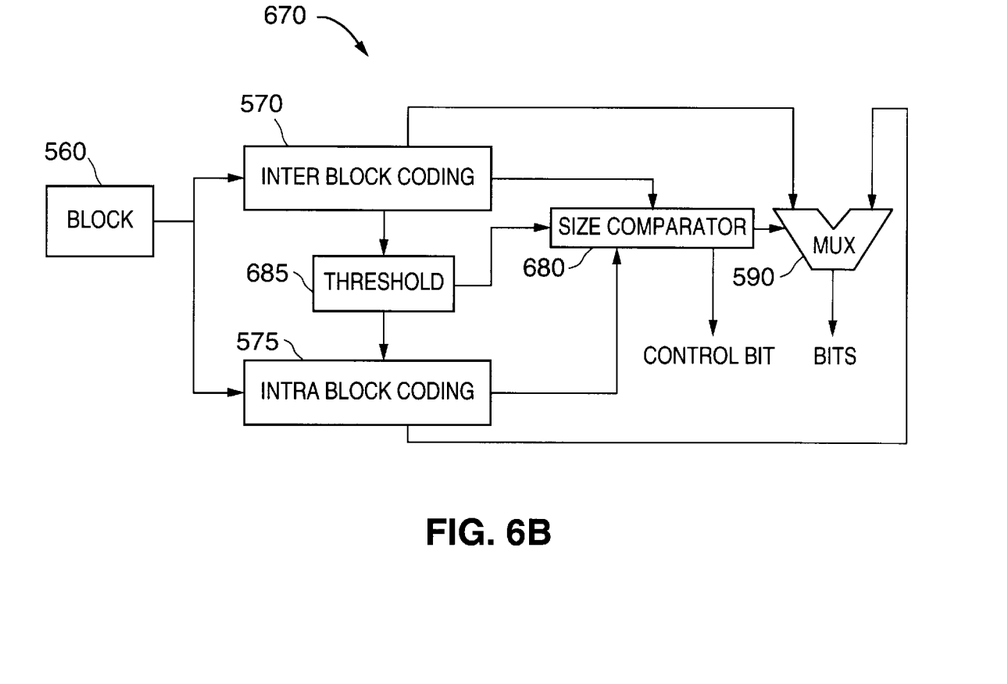

FIGS. 6A and 6B respectively illustrate a coding method 600 and a video encoder 670 which implements coding method 600. Video encoder 670 contains many of the same elements as video encoder 550 of FIG. 5B, and the above description of elements of encoder 550 applies to elements of encoder 670 which have the same reference numbers as the elements of encoder 550. Encoder 670 also contains a threshold comparator 685 which compares (step 620) a threshold length tH to the length (in bits) of an inter-code from inter-coding element 570. If the inter-code is longer than threshold length tH, threshold comparator 685 enables coding element 575 which intra-codes (step 640) the root block and then size comparator 680 compares (step 650) the lengths of the intra-code and inter-code. After the comparison 650, the shortest of the intra-code and inter-code is used in step 630 or 660.

If the inter-code is shorter than threshold length tH, coding element 575 is disabled, and size comparator 680 automatically generates a control bit indicating the block is inter-coded. Multiplexer 590 selects the inter-code, and encoding of the block is complete without ever calculating the intra-code for the block. In an embodiment where coding elements 570 and 575 operate sequentially, eliminating intra-coding for blocks efficiently inter-coded increases the coding speed of video encoder 670 relative to encoder 550.

The complexity (i.e. the required number of calculations) for coding method 600 depends on number of root blocks for which both inter-coding 610 and intra-coding 640 are performed. Threshold length tH controls the complexity of video encoder 670 and can be adjusted in a software encoder for use in a variety of different platforms have different amounts of available computing power and transmission bandwidth.

Figure 7:
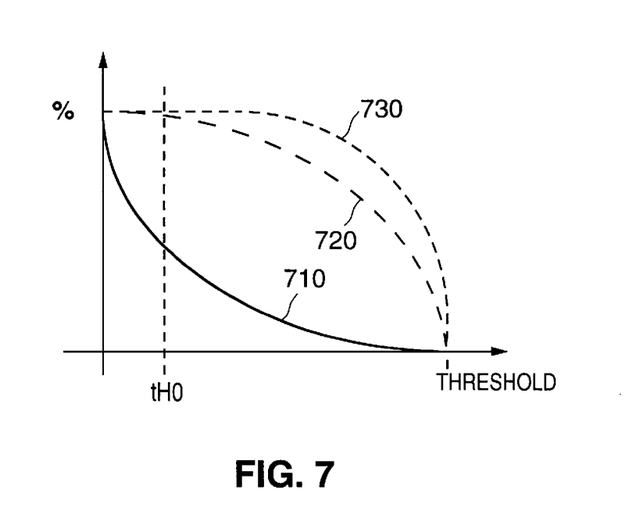
FIG. 7 shows plots illustrating percentages of inter-code lengths less than a threshold, intra-codes used, and reduction in bit rate as functions of a threshold used in the coding method of FIG. 6A.

FIG. 7 shows a plot 710 of the percentage of inter-codes which are longer than thresholds tH. In one extreme, threshold tH is zero so that 100 percent of the inter-codes are longer than threshold tH and a video encoder determines both an inter-code and an intra-code for each root block. This threshold tH is useful for software encoders running on platforms having high power processors and low bandwidth transmission channels, for example, a powerful personal computer connected to POTS (plain old telephone system) lines and executing a software videophone application. In the other extreme, threshold tH is very large, and video encoder 670 only inter-codes root blocks of inter-frames. This is best suited for a computer that is not powerful but is connected to a high bandwidth transmission channel such as IsoEthernet. In different systems, threshold length tH can be preset according to the capabilities of the video encoder implementing coding method 600.

Plot 720 in FIG. 7 shows a percentage indicating the ratio of the number of intra-codes from video encoder 670 to the number of intra-codes from video encoder 550. When threshold tH is zero, video encoder 670 determines an intra-code and an inter-code for each root block and finds all of the shorter intra codes found by video encoder 550. When threshold tH is increased, encoder 670 does not calculate an intra-code for every block, and encoder 670 provides less compression than encoder 550 because encoder 670 does not calculate some of the shorter intra-codes. Plot 730 shows the percentage of the compression improvement achieved by encoder 550 which is also achieved by encoder 670. Plot 710 is concave, while plots 720 and 730 are convex. Accordingly, a threshold tH0 which provides very little loss of compression eliminates intra-coding of many blocks.

For most desktop conferencing systems, balance between computing power and available bandwidth for video data changes; and no one threshold tH fits such systems all of the time. In accordance with an aspect of the invention shown in FIG. 8, a feedback path 800 periodically checks in step 810 the processor and bandwidth used and then in step 820 or 830 adjusts threshold tH used in coding method 600 to operate at an optimum complexity which balances processor and bandwidth loads. Feedback loop 800 can be performed once before encoding of each root block using coding method 600. Alternatively, feedback loop 800 is performed once per data frame, at regular time intervals, or at other intervals.

Figure 8:
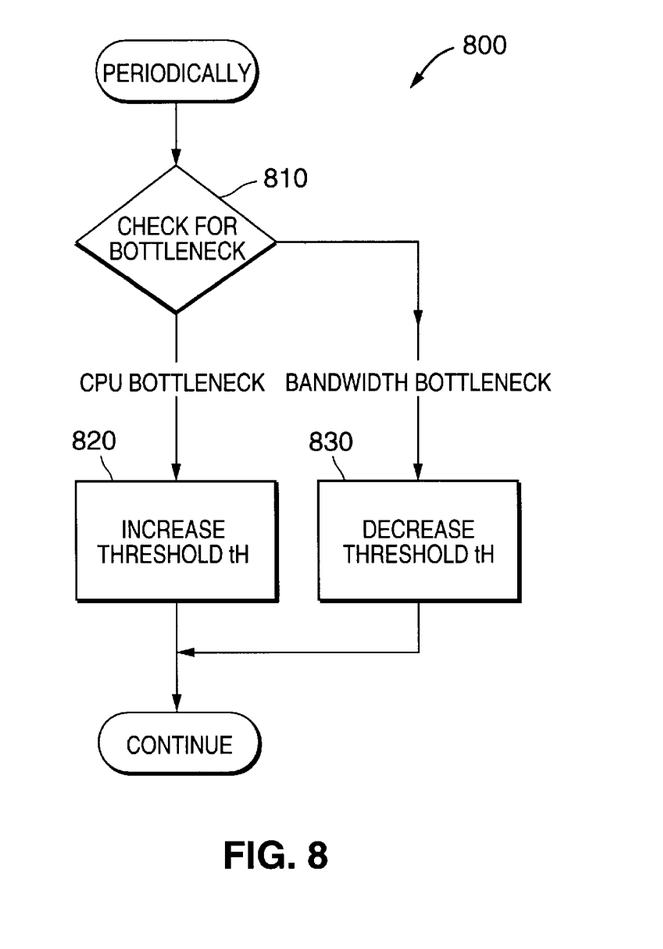
FIG. 8 is a flow diagram of a process which changes coding complexity according to utilization of a processor or a communications channel.

To check for bandwidth bottle necks, the video encoder can examine the amount of data stored in a video data buffer to determine whether the bandwidth of a transmission channel is sufficient to transmit the compressed data as generated. If the video buffer is nearing full, threshold tH is decreased in step 830 to increase complexity and compression. Alternatively, if the video data buffer has room for more data and processor utilization is high, threshold tH is increased to reduce complexity.

Some processors have a utilization index which is stored in a register to indicate processor utilization. Such utilization indices when available can be directly read when checking for bottlenecks in step 810. Alternatively, operating systems such as Windows NT and Windows 95 provide user accessible registries which indicate processor usage.

For older systems where processor usage is difficult to determine, process 800 can examine only the transmit buffer to compare encoding rate to transmission rate. If the encoding rate is higher (i.e. the transmit buffer is nearly full), complexity is increased to select an optimal complexity for the available transmission rate. If the encoding rate is lower (i.e. the transmit buffer is empty), complexity is reduced to maximize use of the available bandwidth or reach the possible minimum complexity for the coding process.

Changing threshold tH does not change the format of the resulting inter-code or the quality of the image provided by a code. Thus, threshold tH is irrelevant to a decoder and need not be transmitted. Changing threshold tH merely trades compression (of the number of bits in the code) for complexity (or the number of calculation required for coding). Changing the complexity of a coding method without changing code format or image quality is achieved in ways other than changing the threshold tH which determines whether to try intra-coding. For example, the size of a search window used during motion estimation provides control of coding complexity. A large search window contains more points to search and therefore requires more calculations. Alternatively, motion estimation method may switch between searching every point in a search window to a hierarchial search technique which only searches selected point in the search window. Generally, more search points improve the chance of finding a best predictive block and improve compression at the expense of additional calculations. Changing the method or range of a search for a predictive block during motion estimation does not change format of the codes or the quality of the image.

Figure 9:
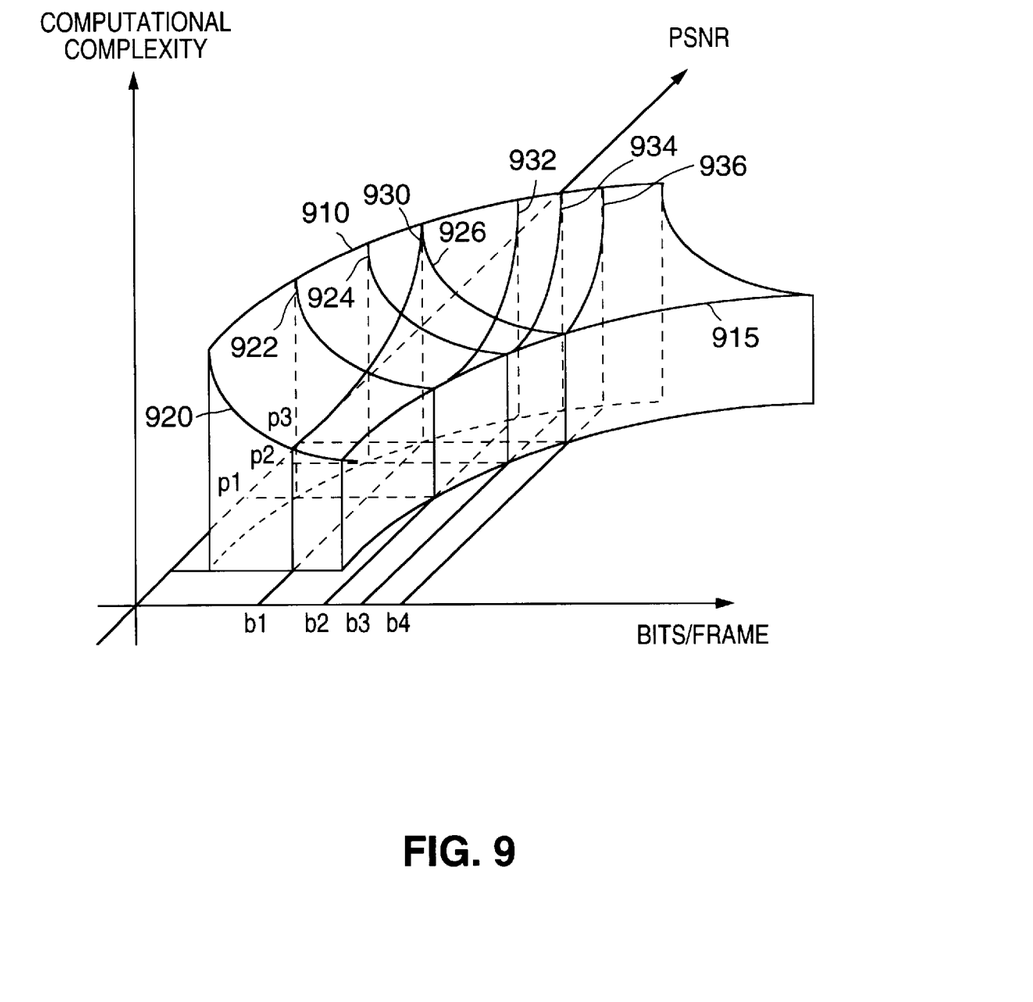
FIG. 9 illustrates relations among coding complexity, bits/frame (compression), and encoded image quality for a coding process in accordance with an embodiment of the invention.

If further improvement in compression is required, image quality can be sacrificed in return for reducing bit rate. For example, quantization step sizes can be increased to decrease the average number of bits per frame. FIG. 9 shows a three dimensional plot of which relates computational complexity, average bits/frame, and peak signal-to-noise ration (PSNR) for coding method 600 described above. A software encoder can adjust the parameters of the coding method to maintain complexity, bit rate, picture quality, or a combination of the three depending on the application of the encoder.

Curves 910 and 915 are curves of constant computational complexity. Curve 910 is the maximum complexity which occurs when threshold tH is 0. Line 915 indicates minimum complexity which occurs when threshold tH is large. A desired bit rate and PSNR can be achieved by proper selection of the complexity provided that desired bit rate and PSNR are within the domain of the surface limit by curves 910 and 915. Once maximum complexity curve 910 is reach PSNR may be decreased to reach the desired bit rate. Complexity, within the range set by the maximum and minimum curves 910 and 915, can be selected and maintained by adjusting bit rate and/or PSNR. Curves 920, 922, 924, and 926 indicate how complexity and/or bit rate change for a constant picture quality (PSNR), and curves 930, 932, 934, and 936 indicate how complexity and/or quality change for a constant bit rate. According to an aspect of the invention, coding complexity adds an additional degree of freedom which is adjustable to meet the goals of restrictions of a video encoder.

Although the invention has been described with reference to particular embodiments, the description is only an example of the invention's application and should not be taken as a limitation. Various adaptations and combinations of features of the embodiments disclosed are within the scope of the present invention as defined by the following claims.

We claim:

1. A method for encoding an image formed by an array of pixels, wherein for each pixel, a combination including a first component and a second component indicates a color for the pixel, the method comprising:

determining a first quadtree structure for a first array which contains the first components of pixels in the image;

generating first code vectors, each first code vector indicating first components within a block in a partition of the first array associated with the first quadtree structure;

partitioning a second array which contains the second components into a second partition associated with the first quadtree structure;

merging blocks of the second partition to determine a third partition, the third partition being associated with a second quadtree structure that is a sub-tree of the first quadtree structure and is formed by removing branches from the first quadtree structure; and generating second code vectors, each second code vector indicating the second components within a block in the third partition.

2. The method of claim 1, wherein the first components are luminances of the pixels, and the second components are chrominances of pixels.

3. The method of claim 1, wherein each first code vector comprises one or more coefficients from a Walsh transform of a corresponding block from the first partition, and each second code vectors comprises one or more coefficients from a Walsh transform of a corresponding block from the third partition.

4. The method of claim 1, further comprising:

generating a first code which indicates the second quadtree structure; and generating a second code which indicates only the branches that must be added to the second quadtree structure to form the first quadtree structure.

5. The method of claim 1, wherein for each pixel, the combination indicating the color for the pixel further includes a third component, and wherein the method further comprises:

partitioning a third array which contains the third components into a fourth partition associated with the second quadtree structure;

merging blocks of the fourth partition to determine a fifth partition, the fifth partition being associated with a third quadtree structure that is a sub-tree of the second quadtree structure and is formed by removing branches from the second quadtree structure; and generating third code vectors, each third code vector indicating the third components within a block in the fifth partition.

6. The method of claim 5, wherein the first components are luminances of the pixels, and the second and third components are chrominances of pixels.

7. The method of claim 5, further comprising:

generating a first code which indicates the third quadtree structure;

generating a second code which indicates the branches that when added to the third quadtree structure form the second quadtree structure; and generating a third code which indicates the branches that when added to the second quadtree structure form the first quadtree structure.

8. A method for intra-coding an image, comprising:

partitioning the image into root blocks;

forming a quadtree partition of each root block, each quadtree partition including blocks of different sizes, wherein forming the quadtree partition of each root block, comprises:

determining a first quadtree partition for a first array representing the root block, wherein the first array contains first color components of pixels in the root block, the first quadtree partition being associated with a first quadtree structure;

partitioning a second array into a second partition associated with the first quadtree structure, wherein the second array contains second color components of pixels in the root block; and merging blocks of the second partition to determine a third partition, the third partition being associated with a second quadtree structure that is a sub-tree of the first quadtree structure and is formed by removing branches from the first quadtree structure; and encoding the blocks, wherein for each block in each quadtree partition, encoding comprises:

determining a vector indicating image content within the block;

selecting a base vector for the block, wherein if the block is encoded after at least one other block in the quadtree partition, the base vector depends upon vectors for one or more previously encoded blocks in the quadtree partition;

determining a difference between the vector and the base vector; and encoding the difference.

9. A method for encoding an image, the method comprising:

applying a first merging procedure to a uniform partition of a first array to determine a first quadtree structure, wherein the first array contains first color components of pixels in the image;

partitioning a second array into a first partition associated with the first quadtree structure, wherein the second array contains second color components of the pixels in the image;

applying a second merging procedure to blocks that are in the first partition of the second array to determine a second partition of the second array, the second partition being associated with a second quadtree structure that is a sub-tree of the first quadtree structure and results from removing branches from the first quadtree structure; and generating a code that indicates:

the second quadtree structure;

second color components for each block in the second partition of the second array;

the branches removed from the first quadtree structure to provide the second quadtree structure; and first color components for each block in a partition associated with the first quadtree structure.

10. The method of claim 9, wherein the first and second merging procedures merge blocks in a partition only if merging the blocks increases error per pixel by less than a threshold amount.

11. The method of claim 9, further comprising:

partitioning a third array into a partition associated with the second quadtree structure, wherein the third array contains third color components of the pixels in the image; and applying a third merging procedure to blocks that are in the partition of the third array to determine a partition associated with a third quadtree structure, the third quadtree structure being a sub-tree of the second quadtree structure and resulting from removing branches from the second quadtree structure, wherein the code indicates the second quadtree structure by indicating the third quadtree structure and the branches removed from the second quadtree structure to form the third quadtree structure.

12. The method of claim 11, wherein:

the first merging procedure makes a determination to merge blocks based on the first color components of pixels in the image, without considering the second and third color components;

the second merging procedure makes a determination to merge blocks based on the second color components of pixels in the image, without considering the first and third color components; and the third merging procedure makes a determination to merge blocks based on the third color components of pixels in the image, without considering the first and second color components.

13. The method of claim 9, wherein:

the first merging procedure makes a determination to merge blocks based on the first color components of pixels in the image, without considering the second color components; and the second merging procedure makes a determination to merge blocks based on the second color components of pixels in the image, without considering the first color components.

* * * * *

UNITED STATES PATENT AND TRADEMARK OFFICE
CERTIFICATE OF CORRECTION

PATENT NO.    : 6,005,981
DATED         : December 21, 1999
INVENTOR(S)   : Hak-Leong Ng and Xiaonong Ran

It is certified that error appears in the above-identified patent and that said Letters Patent is hereby corrected as shown below:

<u>Column 4,</u>
Line 26, after "i.e." insert -- , --.
Lines 54, 59 and 60, after "e.g." insert -- , --.

<u>Column 8,</u>
Line 56, after "i.e." insert -- , --.

Signed and Sealed this

Thirty-first Day of December, 2002

JAMES E. ROGAN
*Director of the United States Patent and Trademark Office*